United States Patent
Stewart et al.

(10) Patent No.: US 12,374,086 B2
(45) Date of Patent: Jul. 29, 2025

(54) SELF-LEARNING NEUROMORPHIC GESTURE RECOGNITION MODELS

(71) Applicant: Accenture Global Solutions Limited, Dublin (IE)

(72) Inventors: Kenneth Michael Stewart, Irvine, CA (US); Lavinia Andreea Danielescu, San Francisco, CA (US); Timothy M. Shea, Merced, CA (US)

(73) Assignee: Accenture Global Solutions Limited, Dublin (IE)

( * ) Notice: Subject to any disclaimer, the term of this patent is extended or adjusted under 35 U.S.C. 154(b) by 389 days.

(21) Appl. No.: 17/992,205

(22) Filed: Nov. 22, 2022

(65) Prior Publication Data

US 2024/0169696 A1    May 23, 2024

(51) Int. Cl.
*G06V 10/774* (2022.01)
*G06V 10/762* (2022.01)
*G06V 10/764* (2022.01)
*G06V 10/776* (2022.01)
*G06V 10/82* (2022.01)
*G06V 40/20* (2022.01)

(52) U.S. Cl.
CPC .......... *G06V 10/774* (2022.01); *G06V 10/762* (2022.01); *G06V 10/764* (2022.01); *G06V 10/776* (2022.01); *G06V 10/82* (2022.01); *G06V 40/20* (2022.01)

(58) Field of Classification Search
CPC .... G06V 10/774; G06V 10/762; G06V 10/82; G06V 40/20; G06V 10/776; G06V 10/764
See application file for complete search history.

(56) References Cited

U.S. PATENT DOCUMENTS

| | | | | |
|---|---|---|---|---|
| 6,460,036 B1 * | 10/2002 | Herz | ................ | H04N 21/4755 348/E7.071 |
| 2021/0295423 A1 * | 9/2021 | Gupta | ................ | G06V 10/764 |

OTHER PUBLICATIONS

Kubota et al., "Gesture Recognition for A Partner Robot Based on Computational Intelligence", 2008, IEEE International Conference on Fuzzy Systems (Fuzz 2008), pp. 1477-1482 (Year: 2008).*

(Continued)

*Primary Examiner* — David F Dunphy
(74) *Attorney, Agent, or Firm* — POLSINELLI PC

(57) ABSTRACT

Methods, systems, and apparatus, including computer programs encoded on computer storage media, for updating a trained gesture recognition model deployed on a neuromorphic processor that has been trained to process data that characterizes the new gesture and to determine a gesture classification for the gesture are described. A method includes receiving data that characterizes a new gesture and processing the data to generate a new embedding in a latent space. For each of multiple clusters of reference embeddings in the latent space, a respective distance in the latent space between the cluster of reference embedding and the new embedding is determined. A determination is made, based on applying one or more learning rules to the distances, one or more procedures to update the gesture recognition model. A determination is made, in accordance with the determined procedure(s), an update to values of one or more parameters of the gesture recognition model.

18 Claims, 9 Drawing Sheets

(56) References Cited

OTHER PUBLICATIONS

Neftci et al., "Surrogate Gradient Learning in Spiking Neural Networks," IEEE Signal Processing Magazine, Nov. 5, 2019, 36(6):51-63.
Stewart et al., "Encoding Event-Based Data With a Hybrid SNN Guided Variational Auto-encoder in Neuromorphic Hardware," Presented at Proceedings of the 2022 Annual Neuro-Inspired Computational Elements Conference, Virtual Event, Mar. 28-Apr. 1, 2022, 88-97.

* cited by examiner

SELF-LEARNING NEUROMORPHIC GESTURE RECOGNITION MODELS

FIELD

This specification generally relates to machine learning and gesture recognition.

BACKGROUND

Gesture recognition technology enables devices to detect human motions in order to initiate electronic commands instead of or in addition to the use of other computer interface devices (mouse, keyboard, etc.). Examples of the areas in gesture recognition include hand, arm, and face gesture recognition. This technology makes it possible for a human to communicate more effectively, more efficiently, or both with a computerized device.

SUMMARY

This specification generally describes a gesture recognition system and techniques that employ a client device having a neuromorphic processor that runs a gesture recognition model and enables the parameters of the gesture recognition model to be updated continuously based on one or more learning rules. The client device can use the gesture recognition model to identify and classify gestures of interest from data generated as a result of user interaction with the client device. Self-learning gesture recognition models deployed on neuromorphic processors described in this specification can achieve accurate recognition for gestures that are under-represented in labeled gesture training data, gestures consisting of complex movements, gestures generated by user populations with different preferences or behaviors, and the like. The self-learning gesture recognition models can also achieve accurate gesture recognition in changing or diverse backgrounds. This enables the gesture recognition technology to accommodate a wider range of different gestures without the required complexities of developing a custom gesture model for each new gesture.

In general, one innovative aspect of the subject matter described in this specification can be embodied in methods that include the actions of receiving, by a trained gesture recognition model deployed on a neuromorphic processor of a client device, data that characterizes a new gesture, wherein the trained gesture recognition model has been trained to process the data that characterizes the new gesture and to determine a gesture classification for the new gesture from a predetermined set of gesture classifications; processing, by the trained gesture recognition model, the data that characterizes the new gesture to generate a new embedding in a latent space; for each of multiple clusters of reference embeddings in the latent space, determining a respective distance in the latent space between (i) the cluster of reference embedding and (ii) the new embedding, wherein each reference embedding is generated by the trained gesture recognition model from processing data that characterizes a reference gesture, and wherein each cluster of reference embeddings corresponds to one gesture classification in the predetermined set of gesture classifications; determining, by the neuromorphic processor and based on applying one or more learning rules to the respective distances in the latent space, one or more procedures to update the trained gesture recognition model; and determining, by the neuromorphic processor and in accordance with the one or more determined procedures, an update to values of one or more parameters of the trained gesture recognition model.

Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination.

The trained gesture recognition model can be implemented as a spiking neural network (SNN).

The data that characterizes the gesture can include streaming data transmitted from a vision sensor of the client device.

Determining one or more procedures to update the trained gesture recognition model can include determining a procedure to update the trained gesture recognition model such that the updated trained gesture recognition model determines a new gesture classification for the new gesture that is not in the predetermined set of gesture classifications.

Determining one or more procedures to update the trained gesture recognition model can include determining a procedure to update the trained gesture recognition model such that the updated trained gesture recognition model modifies one of the predetermined set of gesture classifications and determines the modified gesture classification for the new gesture.

Determining one or more procedures to update the trained gesture recognition model can include determining that the new gesture embedding is outside of a boundary of a first cluster of reference embeddings but a distance in the latent space between the new embedding and the boundary of the first cluster of reference embeddings is below a threshold distance, and determining a procedure to update the trained gesture recognition model such that new embedding is within the boundary of the first cluster of reference embeddings.

Determining one or more procedures to update the trained gesture recognition model can include determining that the new embedding is outside of the boundary of the first cluster of reference embeddings and the distance in the latent space between the new embedding and the boundary of the first cluster of reference embeddings is above a threshold distance; and determining a procedure to update the trained gesture recognition model such that new embedding is within a boundary of a new cluster of embeddings that include the new embedding, wherein the new cluster of embeddings corresponds to the new gesture classification that is not in the predetermined set of gesture classifications.

Determining one or more procedures to update the trained gesture recognition model can include determining that a first distance between the new embedding and a center of the first cluster of reference embeddings is greater than a second distance between the new embedding and a center of a second cluster of reference embeddings; and determining a procedure to update the trained gesture recognition model such that the center of the second cluster of reference embeddings shifts closer to the new embedding and farther away from the center of the first cluster of reference embeddings.

Determining one or more procedures to update the trained gesture recognition model can include determining that a first distance between the new gesture embedding and the boundary of the first cluster of reference embeddings and a second distance between the new gesture embedding and a boundary of the second cluster of reference embeddings are both below a threshold distance; and determining a procedure to update the trained gesture recognition model such that the boundary of the first cluster of reference embeddings and the boundary of the second cluster of reference embeddings are both shifted farther away from the new embedding.

Determining one or more procedures to update the trained gesture recognition model can include receiving a user input specifying a ground truth gesture classification for the new gesture and determining a procedure to update the trained gesture recognition model such that the trained gesture recognition model determines the ground truth gesture classification for the new gesture.

The user input specifying a ground truth gesture classification for the new gesture can include a text or audio input.

The trained gesture recognition model can be obtained through a gradient-based optimization process based on a surrogate gradient of a supervised generative loss function computed with respect to the parameters of the gesture recognition model.

Particular embodiments of the subject matter described in this specification can be implemented to realize one or more of the following advantages. Deploying a self-learning gesture recognition model on neuromorphic edge hardware (e.g., a neuromorphic processor) of an edge device as described in this application enables the gesture recognition model to be updated continuously, e.g., in real-time or near-real-time, at the edge device, which typically has limited computation resources relative to servers or cloud-based machine learning hardware. For example, a combination of learning rules described in this application can be selected and adapted to the capabilities of the neuromorphic processor such that robust gesture recognition model self-learning can be achieved on a lower power client device rather than in the cloud, e.g., on client devices having lower energy capabilities and less computational power relative to cloud-based or local server computers. This enables the gesture recognition model to be updated faster than cloud-based approaches and enables the gesture recognition model to be updated after each gesture recognition event or after particular gesture recognition events, e.g., each time the gesture recognition model is used to recognize a gesture, without waiting for cloud-based hardware to retrain a model based on updated training data.

The techniques described herein allow for continuously adapting to small variations in gestures at an edge device so that each new gesture production can be successfully recognized and acted upon. The continuous adaptation happens through continual online learning rules that are processed at the edge device. Online learning involves learning directly from streamed data in real or close to real-time. This is made possible by the computational efficiency of neuromorphic processors and the event-based data obtained from neuromorphic sensors, in combination with the learning rules described herein.

This system consists of a neuromorphic processor capable of continuously modifying parameters of a neural network while performing a classification task; (1) a spiking neural network model, (2) one or more learning rules, and (3) a process for self-supervised gating of the learning rule based on a model of inter- and intra-class similarity of data.

For example, the neuromorphic processor can update the gesture recognition model immediately (or within seconds or minutes) after a user corrects a human machine interface (HMI) of a device on which the gesture recognition model is deployed. In a particular example, if a user corrects the gesture recognition model by, for example, vocally giving a description of the gesture that the model misrecognized through a microphone of the device, a conversational agent of the human machine interface can trigger a learning process of the neuromorphic processor and the neuromorphic processor can update the gesture recognition model based on the correction in real-time, e.g., within seconds, of the correction being detected. This real-time updating reduces the number of mistakes made by a gesture recognition component of the device in the future and results in faster and more accurate learning of the gesture recognition model, which in turn reduces user frustration and reduces the number of errors caused by misrecognizing user gestures that cause other components to perform actions.

The details of one or more implementations of the present disclosure are set forth in the accompanying drawings and the description below. Other features and advantages of the present disclosure will be apparent from the description, drawings, and from the claims.

BRIEF DESCRIPTION OF THE DRAWINGS

Like reference numbers and designations in the various drawings indicate like elements.

DETAILED DESCRIPTION

Figure 1:
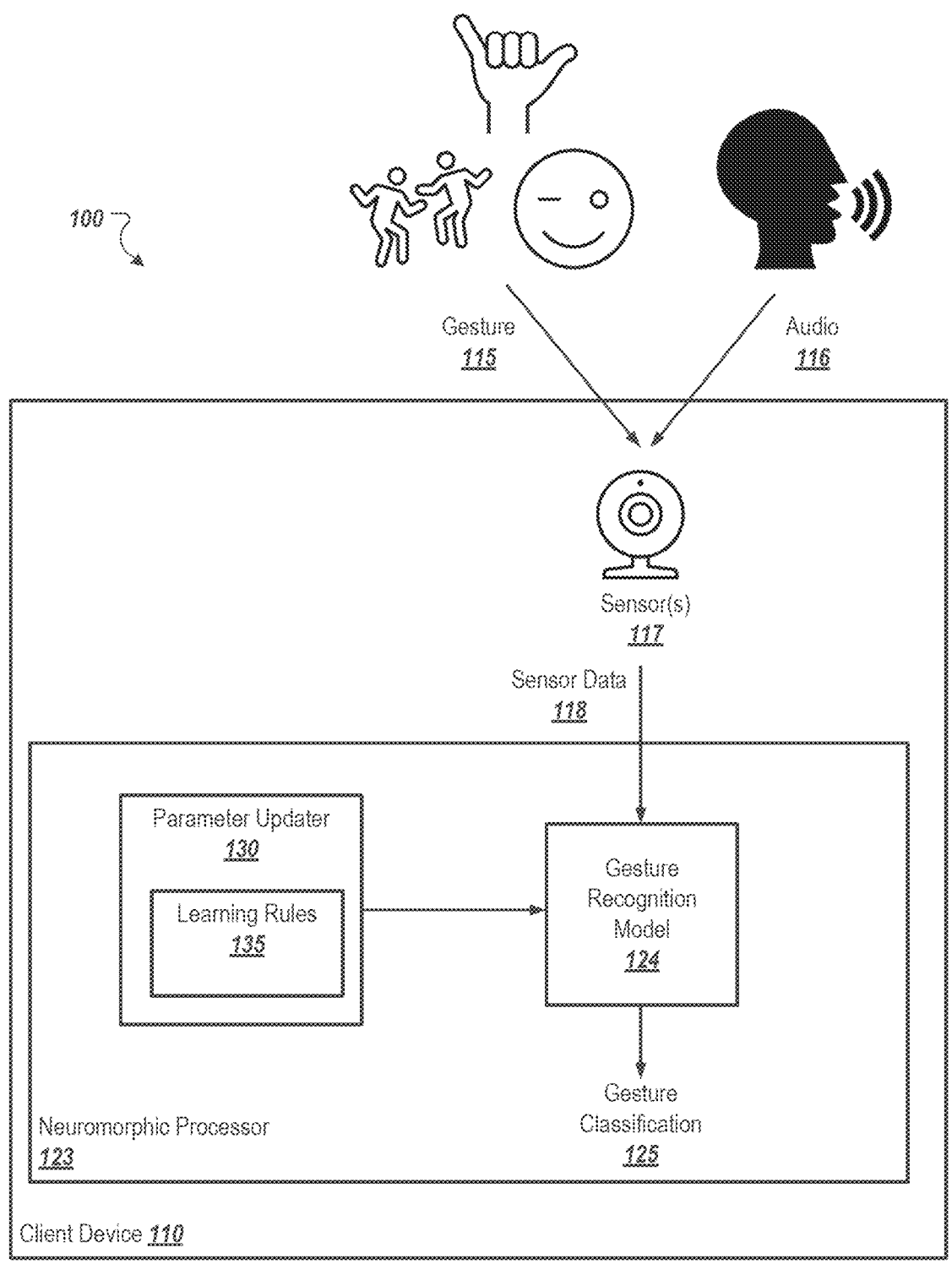
FIG. 1 depicts an example environment in which a neuromorphic processor runs a self-learning gesture recognition model on a client device to recognize gestures.

FIG. 1 depicts an example environment 100 in which a neuromorphic processor 123 runs a self-learning gesture recognition model 124 on a client device 110 to recognize gestures. Example client devices 110 include personal computers, mobile communication devices, e.g., smart phones and/or tablet computers, smart speakers, Internet of Things (IoT) devices, and/or other types of edge devices. In general, an edge device is a device that is located close to the edge of a distributed computing topology such that the edge device is closer to where data (e.g., sensor input) is collected rather than at a central location, e.g., in the cloud.

The client device 110 can receive sensor data 118 captured by one or more sensors 117. Example sensors include vision sensors (e.g., cameras), sound sensors (e.g., microphones), and motion sensors (e.g., accelerometers). As a particular example, the one or more sensors 117 can include, e.g., among multiple camera sensors capturing various types of vision data, a neuromorphic dynamic vision sensor, which implements specialized sensory processing functions in analog electronic circuits inspired by a biological retina that capture temporal, pixel-wise intensity changes as a sparse stream of binary events. This neuromorphic dynamic vision sensor has key advantages, such as faster response times, better temporal resolution, and invariance to static image features like lighting and background. Thus, sensor data 118 captured by a neuromorphic dynamic vision sensor, which may be in the format of event-based spiking data, intrinsically emphasizes the dynamic movements that comprise most natural gestures. In this example, the one or more sensors 117 can additionally include an RGB camera sensor, and the sensor data 118 captured by the camera sensor can be processed, e.g., converted to the same format as the sensor data captured by the neuromorphic dynamic vision sensor, using an open source library or other appropriate technique.

In some cases, the one or more sensors 117 are part of the client device 110 as shown in FIG. 1, while in other cases, they are communicably coupled to the client device 110, e.g., via a wired or wireless connection. In some cases, the sensor data 118 includes batch sensor data while in other cases, the sensor data 118 includes streaming sensor data. That is, in some cases, the client device 110 processes a volume of sensor data obtained from a storage component in batches, while in other cases, the client device 110 processes a continuous stream of sensor data immediately as it is produced by the sensors and transmitted to the device.

A vision sensor can capture vision sensor data that characterizes a gesture 115 made by a user, e.g., a user of the client device 110. For example, the gesture 115 can be a hand gesture, a body gesture such as an arm gesture, a face gesture, or the like, and the vision data can be image data, video data, or the like. A sound sensor can capture audio sensor data that describes an audio 116 of the user. For example, the audio 116 can be a speech of the user.

The client device 110 can perform actions based on sensor data 118 collected by the one or more sensors 117 and processed by the neuromorphic processor 123. For example, the client device 110 can perform actions in response to commands corresponding to gestures identified and recognized from the sensor data 118 that characterizes gestures captured by using a vision sensor and processed by the neuromorphic processor 123. In a particular example, the command corresponding to a two-finger-horizontal swipe gesture can be for a video conferencing system that includes the gesture recognition model to expand the video to panorama mode. In response to recognizing the command, the video conferencing system expands the video to panorama mode.

The neuromorphic processor 123 of the client device 110 runs the self-learning gesture recognition model 124, which is also referred to as gesture recognition model 124 for brevity, and updates the gesture recognition model 124. The gesture recognition model 124 can be configured to receive the sensor data 118 that characterizes a gesture and to process the sensor data 118 in accordance with current, e.g., trained, parameter values of the gesture recognition model to determine a classification 125 for the gesture from a predetermined set of classifications. The gesture can be either static or dynamic, and the classification 125 can be, for example, a class, a type, a group, or a category of the gesture.

As an example for illustration, the gesture recognition model 124 can be configured to classify a gesture into one of a predetermined set of hand gesture classifications. For example, the set of hand gestures can include: moving either the hand or two fingers up, down, left or right; clicking with the index finger; beckoning; opening or shaking the hand; showing the index finger, or two or three fingers; pushing the hand up, down, out or in; rotating two fingers clockwise or counter-clockwise; pushing two fingers forward; closing the hand twice; showing "thumb up" or "OK"; and/or other appropriate hand gestures. It will be appreciated that, in other examples, the predetermined set of hand gestures classifications includes more or less of such classifications. In some case, the gesture classifications may be preconfigured, while in other cases, the gesture classifications may be defined by the user or a group of users. Many client devices 100 include or are coupled with another human machine interface (HMI), e.g., a mouse, keyboard, speech recognition modules/devices, touchpads, and so on. Each of some or all of the gesture classifications 125 may correspond to a respective command entered through the HMI by the user who is making the gestures.

The gesture recognition model 124 can be implemented as a spiking neural network (SNN) that runs on the neuromorphic processor 123. A spiking neural network is an artificial neural network that uses biologically realistic models of neurons to closely imitate natural neural networks. An example architecture of a suitable spiking neural network is described in more detail in K. Stewart, et al. "Encoding Event-Based Data With a Hybrid SNN Guided Variational Auto-encoder in Neuromorphic Hardware." Neuro-Inspired Computational Elements Conference. 2022, the entire contents of which are hereby incorporated by reference herein in their entirety. This example SNN includes a convolutional encoder SNN that encodes a network input into an embedding or latent space, and a non-spiking decoder convolutional neural network that processes the embedding to generate a reconstruction of the network input.

Example neuromorphic processors include Intel's Loihi chip and BrainChip's Akida™ chip. The neuromorphic processor 123 includes special-purpose machine learning circuits. For example, the neuromorphic processor 123 can include neurons that are implemented as hardware neuron cores and that output spikes based on voltage or current inputs to the neurons. A neuron core can output spikes based on the neuron voltage reaching a threshold after integrating input spikes or current. The spikes can be signals, e.g., messages, sent between neurons and, in some cases, can carry a message payload. A spike is a binary signal that can be positive or negative and that modifies the voltage of neurons based on the weight of the synapse.

In some implementations, the neurons of the neuromorphic processor 123 follow the one-step leaky-integrate-and-fire (LIF) dynamics (each presynaptic spike directly increases the membrane voltage of the postsynaptic neuron). However, the gesture recognition model 124 could be effectively implemented with non-leaky neurons (IF), two-step LIF neurons (each presynaptic spike generates a current, which is in turn integrated into the voltage of the postsynaptic neuron's membrane potential), Izhikevich neurons, resonate-and-fire neurons, and/or other appropriate types of neurons.

In some implementations, the voltage can be increased at the neuron upon receipt of each spike until a threshold is reached, e.g., using the LIF dynamics. The voltage can also decay over time if regular input is not received. When the threshold is reached, that neuron can fire, e.g., output spike signals to a next neuron in the network and the voltage is reset. Connection weights at the input to a neuron can control the increase in the voltage value at the neuron caused by each spike.

Through these connections, the neurons can form a network that can be made up of one or more layers. The neurons in the network will encode information based on the timing of the spike input received, the LIF dynamics, and the connection weights. The encoded information will represent different features extracted from the input, except for the output layer of neurons which will be used to generate the likelihood of the input being a particular gesture classification. This SNN will be used for the gesture recognition model 124 whose connection weights can be updated through initial offline training before deployment at the client device 110, and later updated by a parameter updater 130 and in accordance with one or more learning rules 135 at the client device 110 after deployment.

During the initial training of the gesture recognition model 124, the neuromorphic processor 123 or another neuromorphic processor (e.g., one running on a server or in a cloud platform) can update parameters of the SNN, including the connection weights of the neurons, to reduce errors in the recognition of gesture input, to improve the quality of the reconstruction of the network input, or both. In some implementations, other parameters can also be updated, such as the number of neurons and/or the thresholds of the neurons. In general, the training neuromorphic processor can use supervised learning techniques to train the gesture recognition model 124 based on a set of training data. The training data can include labeled training data generated from historical vision sensor data previously captured by using the one or more sensors 117 or different sensors. The labeled training data can include, for each training example which generally includes vision sensor data that characterizes a gesture, a label that indicates the ground truth classification of the gesture, i.e., the target classification that should be determined by the gesture recognition model 124 by processing the training example.

A loss function can be used to quantify the error for the predicted classification relative to the ground truth classification of the gesture characterized by each training example. For example, in some implementations where the gesture recognition model 124 is configured as a hybrid SNN guided VAE, the loss function can be a supervised generative loss function which includes both a discriminative loss term computed with respect to a first subset of latent variables and a classification loss term computed with respect to a second subset of latent variables, with the latent variables being generated by the gesture recognition model 124 from processing each training example. A latent variable is any value that is defined by the outputs of one or more intermediate layers of the gesture recognition model 124, e.g., the outputs of a last layer of the convolutional encoder SNN of the hybrid SNN guided VAE, based on processing a training example that includes data that characterizes a gesture. An example of such loss function can be found in K. Stewart, et al. "Encoding Event-Based Data With a Hybrid SNN Guided Variational Auto-encoder in Neuromorphic Hardware." Neuro-Inspired Computational Elements Conference. 2022, as mentioned above.

As part of the initial training, the neuromorphic processor 123 or the cloud platform can update the parameters of the gesture recognition model 124 to optimize the computed loss between the predicted and ground truth classification for each training example using the loss function. In some implementations, this can be done through a gradient-based optimization process, e.g., by computing the gradients of the loss function with respect to the parameters of the gesture recognition model 124 by using the surrogate gradients approach described in more detail in E. O. Neftci, et al. "Surrogate Gradient Learning in Spiking Neural Networks: Bringing the Power of Gradient-Based Optimization to Spiking Neural Networks." IEEE Signal Processing Magazine 36, 6 (November 2019), 51-63. https://doi.org/10.1109/MSP.2019.2931595, the entire contents of which are hereby incorporated by reference herein in their entirety.

The neuromorphic processor 123 or the cloud platform can continue training the gesture recognition model 124 until a stop condition is met. For example, the stop condition can be when the computed loss is less than a threshold for at least a specified quantity of predicted gesture classifications.

In some implementations, the gesture recognition model 124 can be trained to generate embeddings based on the historical vision sensor data that characterizes gestures. These embeddings, which are generally made up of the latent variables output by the model, may capture features, properties, and/or qualities of the gestures, as well as the environments in which those gesture are performed. In some implementations, these embeddings may take the form of "reference" embeddings that correspond to embeddings previously generated by the gesture recognition model 124 based on historical vision sensor data. Put another way, these reference embeddings map or project previous gestures characterized by the historical vision sensor data to a latent space.

As a non-limiting example of how the gesture recognition model 124 is configured to identify and classify gestures of interest may be trained, in some implementations, a first training example may be processed by the model to generate a first reference embedding in the latent space. The first training example may include data that characterizes a particular gesture. A second reference embedding may be generated by the model from processing a second training example that includes data that characterizes the same particular gesture. This particular gesture in the first and second training examples may not be performed by a same user, and due to different user preferences or behaviors, the actual movements that make up the particular gesture may differ from one another. Nonetheless, when the first and second training examples are processed using the gesture recognition model 124 that has been adequately trained, the consequent reference embeddings may be proximate to each other, and may further be proximate to the reference embedding generated in the latent space that have been generated from other training examples that include data that characterizes the same particular gesture. In other words, the initial training facilitates clustering of reference embeddings generated from training examples characterizing a same gesture in the latent space, even if some of the constituent movements of the gesture or the background of the gesture differ somewhat from one training example to another.

If initially trained by a cloud platform, the cloud platform can deploy the gesture recognition model 124 to the neuromorphic processor 124, e.g., by providing the SNN of the gesture recognition model 124 to the client device 110. After deploying the trained gesture recognition model 124 to the neuromorphic processor 124 at the client device 110, the neuromorphic processor 124 can use a set of learning rules 135 to update, e.g., continuously and/or in real-time, the gesture recognition model 124 at the client device 110 as part of self-learning for the model. In this way, the neuromorphic processor 123 can adapt the gesture recognition model 124 for the particular gestures made by the user(s) of the client device 110, thereby providing more accurate gesture recognition for the user(s) quickly and efficiently. The neuromorphic processor 124 can also use the learning rule(s) to adapt the gesture recognition model 124 for particular environmental conditions, such as noise, distance of the user from the one or more sensors 117, sensor parameters, and/or other physical parameters that can be learned from for better separation and background suppression. The client device 110 can provide the updated gesture recognition model 124 back to the cloud platform. In this way, the cloud platform can further update the gesture recognition model 124 with additional training and/or deploy the updated gesture recognition model 124 on other client devices.

In some implementations, the neuromorphic processor 123 can process one or more of the learning rules in the set 135 continuously and/or for each or some gesture recognition events and update the parameters of the gesture recognition model 124 each time the learning rule(s) are processed or each time a learning rule indicates that the parameters of the gesture recognition model 124 should be updated.

In some implementations, the neuromorphic processor 123 can selectively process the learning rules based on the type of gesture recognition event. For example, a learning rule can correspond to a user correction of a gesture recognition result where a user actively corrects the gesture recognition model 124, e.g., by way of vocally giving a description of a gesture that the model misrecognized through a microphone of the device, or simply by making the same gesture repeatedly, e.g., for a second time, a third time, and so on. In this example, the neuromorphic processor 123 may only process this rule in response to a user correction event to determine a procedure to update the parameters of the gesture recognition model 124. As another example, one or more other learning rules can correspond to distances between a new gesture embedding generated by the model from processing sensor data that characterizes a new gesture and the reference embeddings in the latent space. In this example, the neuromorphic processor 123 can iterate through those learning rules in response to every gesture recognition event to determine one or more procedures to update the parameters of the gesture recognition model 124. Example self-learning techniques using example learning rules are described below with reference to FIGS. 2-6.

The neuromorphic processor 123 also includes a parameter updater 130 that can update the parameters of the gesture recognition model 124 based on the parameter updates resulting from the one or more procedures determined from the processing of the one or more of the learning rules. The parameter updater 130 may, but need not, use the same loss function as used during the initial training. For example, while a supervised generative loss function has been used to train the gesture recognition model 124 during initial training, the parameter updater 130 may use a different loss function to determine the update to values of one or more parameters of the trained gesture recognition model 124. For example, a loss function having just the classification loss term of the supervised generative loss function can be used by the parameter updater 130.

In some implementations, the neuromorphic processor 123 is configured to detect when a gesture recognition result is erroneous, e.g., based on feedback from the user. For example, if the client device 110 performs an action that does not correspond to a command that the user's gesture is intended for, the user may provide the command in a different manner, e.g., by vocally providing the command through a microphone, by typing in the command through a keyboard, by clicking or tapping on a touchscreen to select the command, or simply by making the same gesture for one or more additional times. If an error is detected, the neuromorphic processor 123 can instruct the parameter updater 130 to update the SNN in accordance with the one or more determined procedures to reduce the likelihood of the error occurring in the future.

Figure 2:
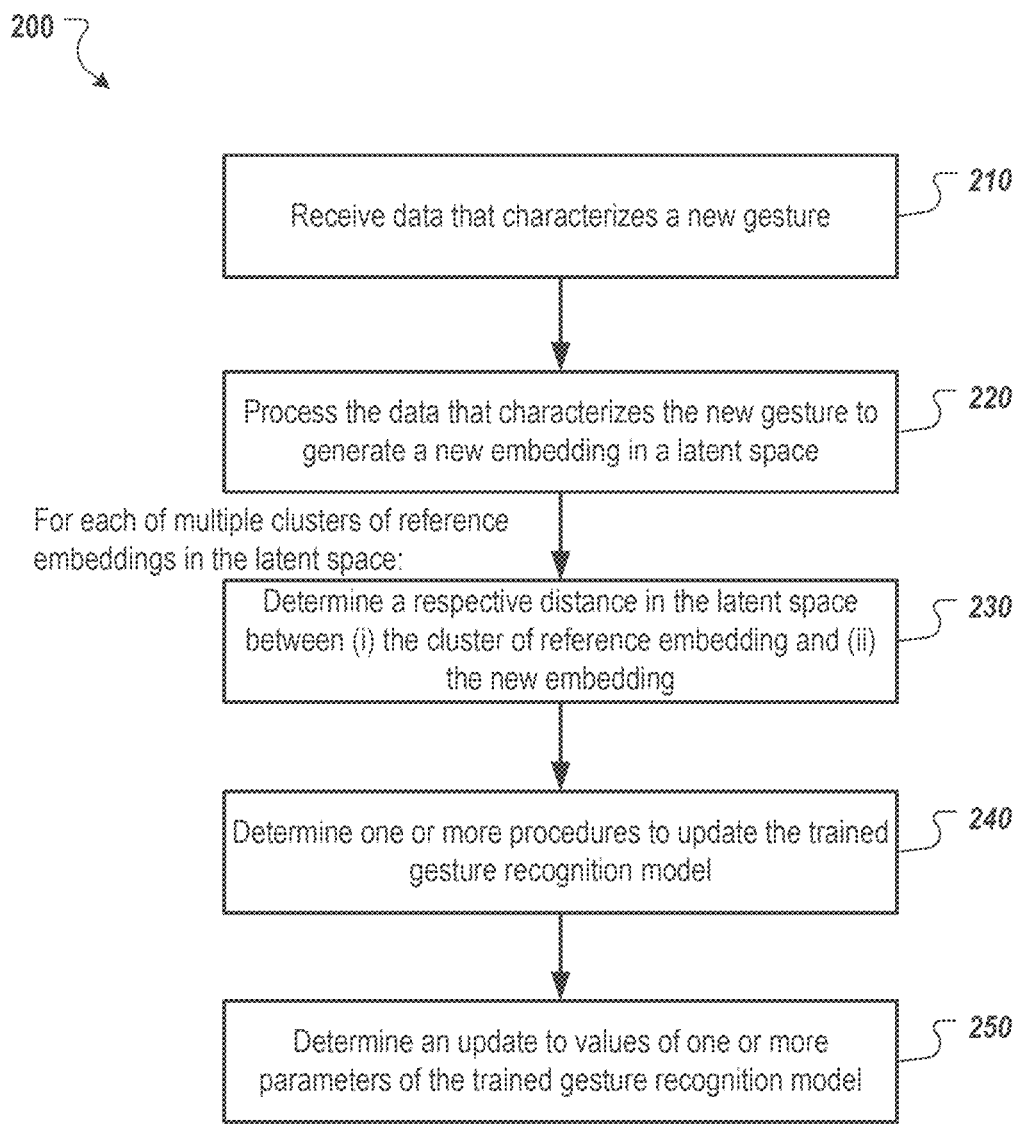
FIG. 2 is a flow diagram of an example process for updating a self-learning gesture recognition model running on a neuromorphic processor.

FIG. 2 is a flow diagram of an example process 200 for updating a self-learning gesture recognition model running on a neuromorphic processor. The example process 200 can be performed by the neuromorphic processor 123 of FIG. 1. The neuromorphic processor 123 can perform the process 200, e.g., continuously, to adapt the gesture recognition model to more accurately recognize gestures made by a user of a client device having a neuromorphic processor on which the gesture recognition model is deployed.

A trained gesture recognition model receives data that characterizes a new gesture (210). In some implementations, the client device may receive the data that characterizes the new gesture as a streaming data input transmitted from a vision sensor that is either part of or communicably coupled to the client device. The vision sensor may capture vision data of a user of the device making the new gesture.

The gesture recognition model can be implemented as a SNN running on the neuromorphic processor. The gesture recognition model has been trained to process the data that characterizes the new gesture and to determine a gesture classification for the new gesture from a predetermined set of gesture classifications.

In some implementations, a cloud platform or one or more servers having, or not having, neuromorphic processors can perform the initial training of the gesture recognition model by using labeled training data. For example, the initial training can be performed on a neuromorphic or another type of machine learning platform. The cloud platform or server(s) can then send data representing the initial trained gesture recognition model to a client device that has a neuromorphic processor installed thereon. The neuromorphic processor can configure a SNN of the neuromorphic processor to match those of the initial trained gesture recognition model.

The trained gesture recognition model processes the data that characterizes the new gesture to generate a new embedding in a latent space (220). Also residing in the latent space are a plurality of reference embeddings. As described above, the reference embeddings are generated by the gesture recognition model based on historical vision sensor data, e.g., generated by the gesture recognition model from processing training examples that include data that characterizes different gestures. Because the gesture recognition model has been adequately trained, these reference embeddings are clustered together properly in the latent space, where each cluster of reference embeddings corresponds to one gesture classification in the predetermined set of gesture classifications.

These reference embeddings may then be used to classify the new gesture. In particular, distances in latent space between the new embedding generated by the model from processing the received data that characterizes the new gesture and the reference embeddings may be used to determine a classification of the new gesture. In other words, the received data that characterizes the new gesture is mapped to the latent space to identify reference embeddings proximate to the new embedding. Here, "proximate" is defined as in terms of a distance value, where the "distance value" may be computed according to a distance measure such as Euclidean distance for two embeddings, although in other implementations another distance measure may be used, such as Manhattan distance and cosine distance. As an example, if the new embedding is within a boundary of, or with a certain radius of a center of, a cluster of reference embeddings corresponding to a first gesture classification in the latent space, the new gesture corresponding to the new embedding may be determined as having the first gesture classification.

For a variety of reasons, however, the results of the classification may be inaccurate. This could be because the constituent movements of the new gesture or the background of the new gesture characterized in the received data differ somewhat from those characterized in the labeled training data. Or, this could be because the received data characterizes a completely new gesture that is different from any of the gesture classifications in the predetermined set. Thus, there is a need for the parameters of the gesture recognition model to be updated continuously based on one or more learning rules.

For each of multiple clusters of reference embeddings in the latent space, the neuromorphic processor determines a respective distance in the latent space between (i) the cluster of reference embedding and (ii) the new embedding generated by the trained gesture recognition model based on processing the data that characterizes the new gesture (230). Next, the neuromorphic processor determines, based on applying one or more learning rules to the respective distances in the latent space, one or more procedures to update the trained gesture recognition model (240). Different learning rules may specify different ways of determining such distances. For example, the distance may be computed in relation to the centers or centroids of the clusters, or alternatively in relation to the boundaries of the clusters, while the distance itself can be a Euclidean distance, a Manhattan distance, cosine distance, or the like.

In various implementations, the neuromorphic processor can use any combination of the learning rules described in the following to update the parameters of the gesture recognition model. Applying some of these example learning rules may involve receiving a user input that specifies or otherwise indicates a gesture classification for the new gesture, and correspondingly using the user specified gesture classification as the ground truth gesture classification for the new gesture in updating the trained gesture recognition model. Specifically, the user input may be in the form of a text or audio input that describes the ground truth gesture classification. The user input may also be in the form of a touch or click input that specifies the correctness of the gesture classification predicted by the model. The user input may further be in the form of a visual input, e.g., an additional visual input that captures a user expression indicative of the correctness of the gesture classification predicted by the model. Other types of user inputs are also possible.

FIGS. 3-8 illustrate some example learning rules that can be used by a neuromorphic processor to update a gesture recognition model based on gestures. The neuromorphic processor can selectively apply the rules and their corresponding update procedures based on conditions related embeddings corresponding to the gestures and embeddings of the trained gesture recognition model, e.g., based on boundaries of clusters of embeddings. In the following examples, a small number of clusters are depicted to illustrate the learning processes of the various learning rules. However, any number of clusters can be learned and used for classification of gestures.

Figure 3:
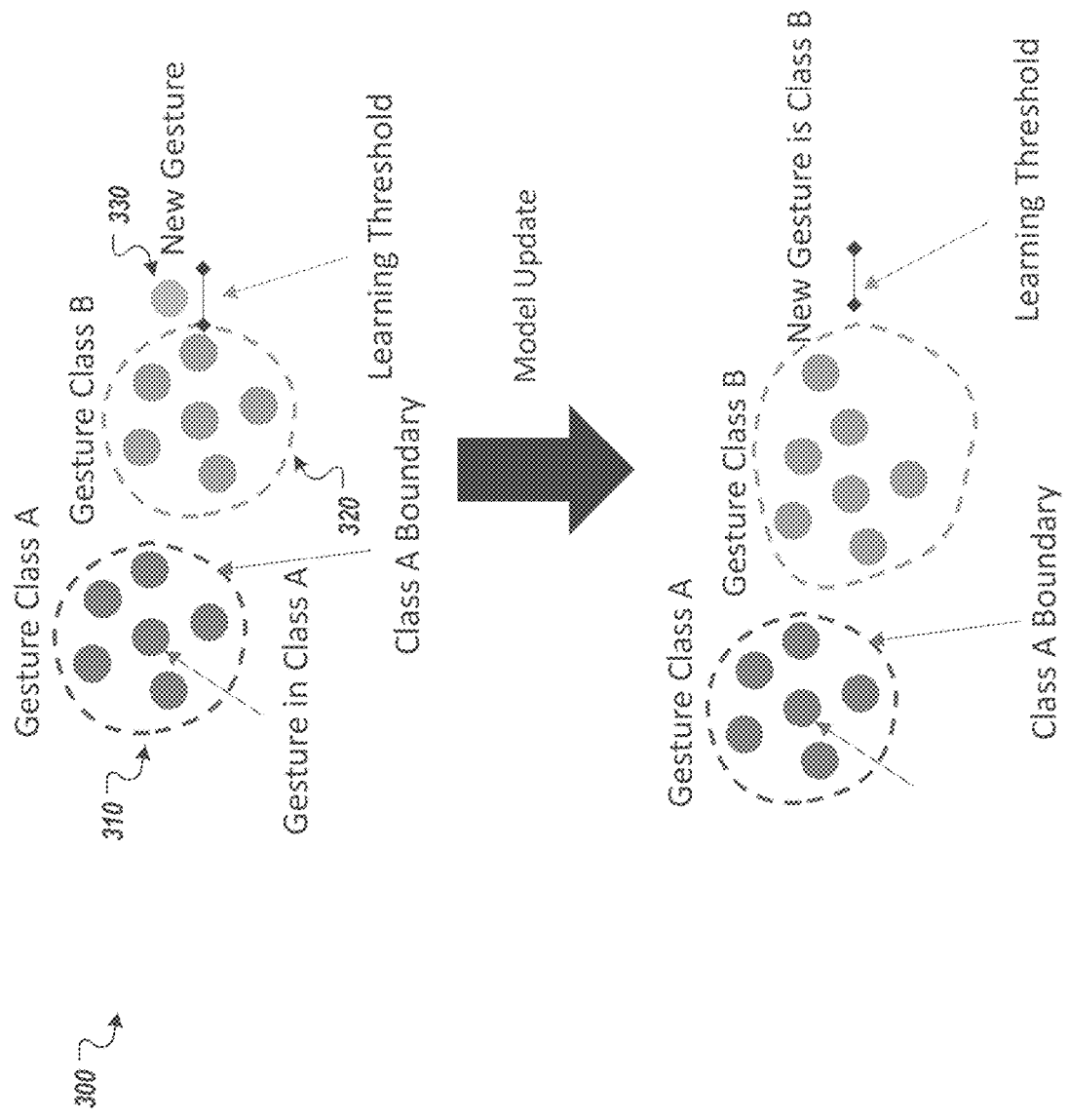
FIG. 3 depicts a first example learning rule for updating a self-learning gesture recognition model.

FIG. 3 depicts a first example learning rule 300 for updating a self-learning gesture recognition model. In the example of FIG. 3, during the initial training process the gesture recognition model may be trained to learn mappings from gestures to regions defined by clusters 310 and 320 in a latent space that correspond to a first gesture classification ("Gesture Class A") and a second gesture classification ("Gesture Class B"), respectively. That is, a cluster 310 of reference embeddings (smaller circles in FIG. 3) generated from training examples that include data that characterizes gestures having the first classification may reside in the region defined by the clusters 310. Another cluster 320 of reference embeddings generated from training examples that include data that characterizes gestures having the second classification may reside in another region defined by other cluster 320. And so on. These regions may be defined in various ways, such as by using the largest enclosing circle, or "convex hull," of all existing reference embeddings for a gesture classification.

The first example learning rule 300 may specify: if the new embedding is outside of a boundary of a region defined by a cluster of reference embeddings (which may be any one of the multiple clusters of reference embeddings in the latent space), but a distance in the latent space between the new embedding and the boundary of the region defined by the cluster of reference embeddings is below a threshold distance, then use a specified update procedure to update the trained gesture recognition model such that new embedding is within the boundary of the cluster of reference embeddings.

As shown in FIG. 3, the new embedding 330 generated in the latent space is outside of both regions, but the new embedding 330 is within a threshold distance to the boundary of the region defined by cluster 320. Accordingly, the first example learning rule specifies that gesture recognition model should be updated such that the new embedding 330 is included in the cluster 320, and that the new embedding 330 is within the boundary of the region defined by the updated cluster 320, which corresponds to the second gesture classification ("Gesture Class B"). That is, by applying the first example learning rule, the neuromorphic processor determines a procedure to update the gesture recognition model such that the updated gesture recognition model modifies the way it has been previously trained to classify a new gesture into one of the predetermined set of gesture classifications and determines the modified gesture classification for the new gesture. The update process can include updating the embeddings in the latent space, as well as updating, by virtue of backpropagation, the parameters of the convolutional encoder SNN of the gesture recognition model which generates the embeddings. The update process can use either the same loss function as the initial training process (that has both a discriminative loss term and a classification loss term) or a different loss function, e.g., a loss function with more or less terms that evaluate different aspects of the embeddings. Although two clusters 310 and 320 are shown in this example, any number of clusters can be learned and used for classification of gestures.

Figure 4:
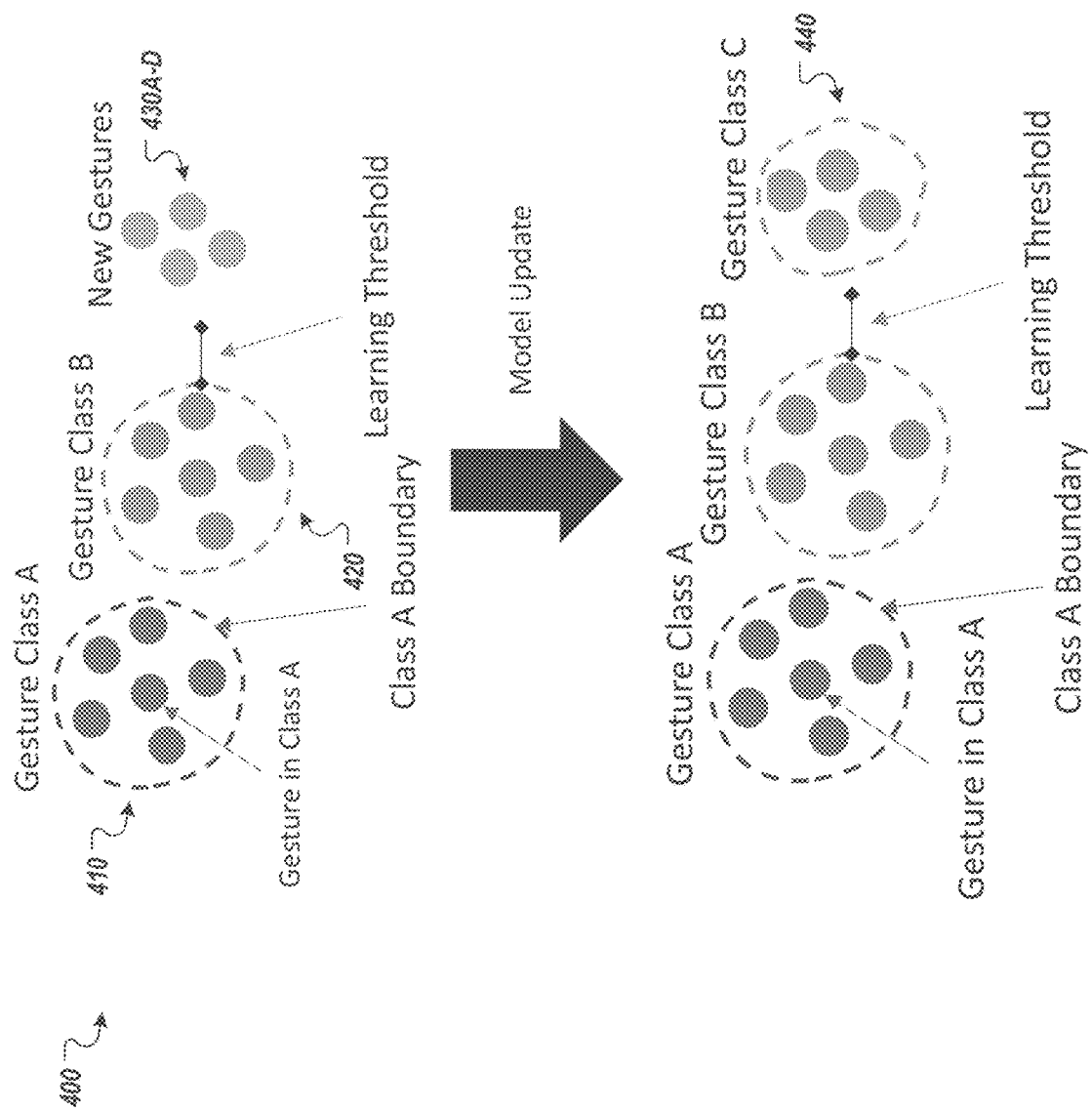
FIG. 4 depicts a second example learning rule for updating a self-learning gesture recognition model.

FIG. 4 depicts a second example learning rule 400 for updating a self-learning gesture recognition model. Similar to the example of FIG. 3, during the initial training process the gesture recognition model can be trained to learn mappings from gestures to regions defined by clusters 410 and 420 in a latent space that correspond to a first gesture classification ("Gesture Class A") and a second gesture classification ("Gesture Class B"), respectively.

The second example learning rule 400 may specify: if the new embedding is outside of the boundary of a region defined by each cluster of reference embeddings and the distance in the latent space between the new embedding and the boundary of the region defined by each cluster of reference embeddings is above a threshold distance, then use a specified update procedure to update the trained gesture recognition model such that new embedding is within a boundary of a region defined by a new cluster of embeddings that include the new embedding, where the new cluster of embeddings corresponds to the new gesture classification that is not in the predetermined set of gesture classifications. The specified update procedure can also include determining the boundary of the new cluster of embeddings.

In some implementations, the second rule 400 may specify: if at least a threshold number of new embeddings are outside of the boundary of a region defined by each cluster of reference embeddings and the distance in the latent space between each of the new embeddings and the boundary of the region defined by each cluster of reference embeddings is above a threshold distance, then use a specified update procedure to update the trained gesture recognition model such that new embedding is within a boundary of a region defined by a new cluster of embeddings that include the new embedding, where the new cluster of embeddings corresponds to the new gesture classification that is not in the predetermined set of gesture classifications. In some implementations, the neuromorphic processor may only apply this rule if the new embeddings that meet the thresholds are within a threshold distance of each other. The specified update procedure can also include determining the boundary of the new cluster of embeddings, which can be the centroid of the new embeddings. In some implementations, in order to apply the second rule 400, the neuromorphic processor maintains a record (e.g., a list) of gestures that (i) have not been classified into any one of the predetermined set gesture classifications by using the gesture recognition model and that (ii) have not triggered any other learning rule to update the gesture recognition model (such that it can be classified into one of the predetermined set of gesture classifications).

As shown in FIG. 4, a total of four new embeddings 430A-D generated in the latent space are all outside of both regions, and each of the new embeddings 430A-D is greater than a threshold distance away from the boundary of the region defined by cluster 420, which may be the closest cluster to the new embeddings. Accordingly, the second example learning rule specifies that the gesture recognition model should be updated such that the new embeddings 430A-D should themselves form a new cluster 440, and that the new embeddings 430A-D are within the boundary of the region defined by the new cluster 440, which corresponds to a new gesture classification ("Gesture Class C") that is not in the predetermined set of gesture classification. That is, by applying the second example learning rule, the neuromorphic processor determines a procedure to update the gesture recognition model such that the updated gesture recognition model adds to the predetermined set of gesture classifications a new gesture classification, i.e., either in addition to the existing gesture classifications in the set or in place of one of the existing gesture classifications, and classifies new gestures into the new gesture classification.

Figure 5:
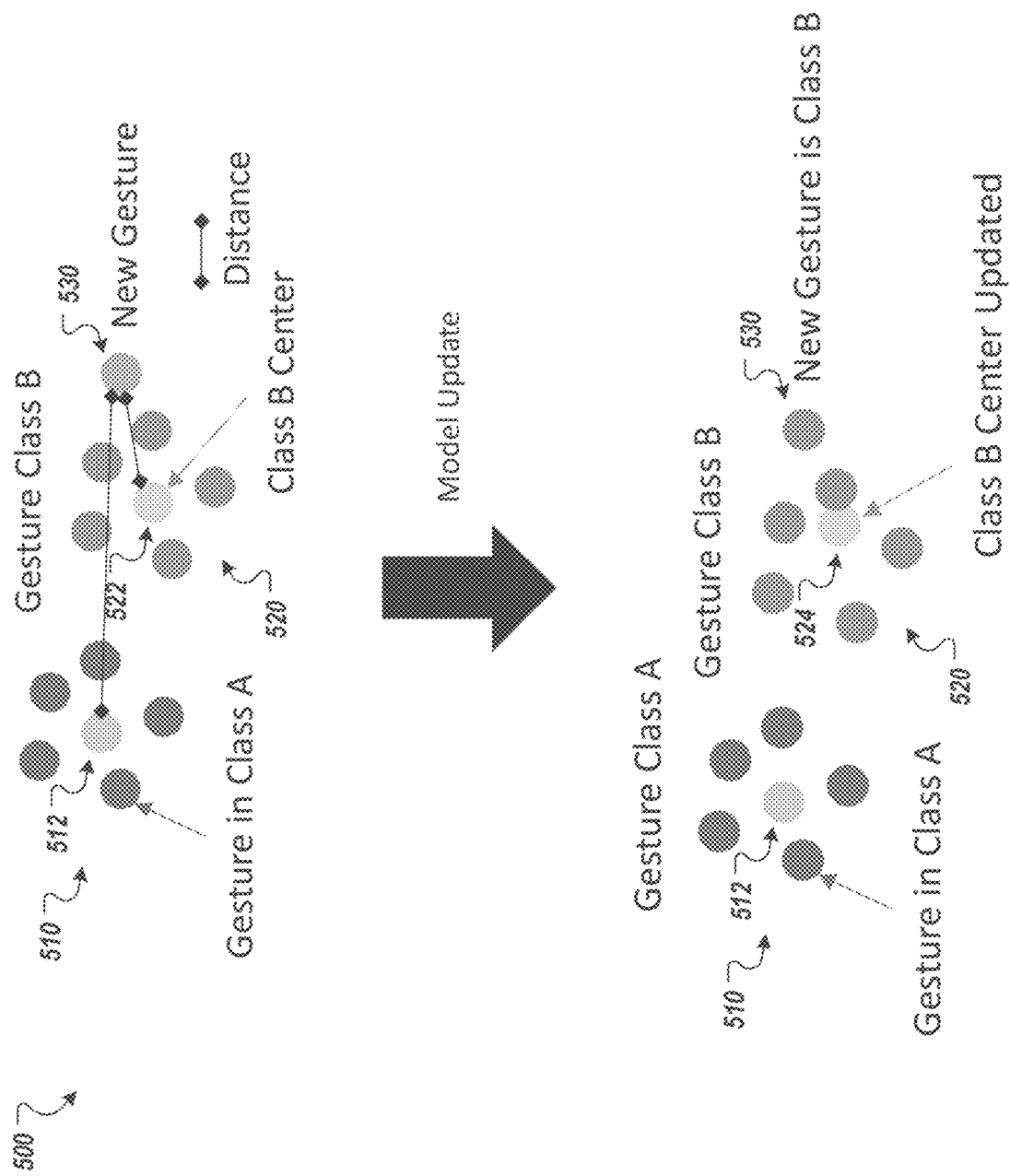
FIG. 5 depicts a third example learning rule for updating a self-learning gesture recognition model.

FIG. 5 depicts a third example learning rule 500 for updating a self-learning gesture recognition model. Similar to the example of FIG. 3, during the initial training process the gesture recognition model may be trained to learn mappings from gestures to regions defined by clusters 510 and 520 in a latent space that correspond to a first gesture classification ("Gesture Class A") and a second gesture classification ("Gesture Class B"), respectively.

The third example learning rule 500 may specify: if a first distance between the new embedding and a center of the first cluster of reference embeddings is greater than a second distance between the new embedding and a center of a second cluster of reference embeddings, then use a procedure to update the trained gesture recognition model such that the center of the second cluster of reference embeddings shifts closer to the new embedding and farther away from the center of the first cluster of reference embeddings.

As shown in FIG. 5, a first distance between the new embedding 530 and a center 512 of the first cluster 510 of reference embeddings is greater than a second distance between the new embedding 530 and a center 522 of a second cluster 520 of reference embeddings. Accordingly, the third example learning rule 500 specifies that gesture recognition model should be updated such that the shifted center 524 of the second cluster 520 of reference embeddings is closer to the new embedding 530 and farther away from the center 512 of the first cluster 510 of reference embeddings. In addition, the new gesture should be classified into the second gesture classification ("Gesture Class B") which corresponds to the second cluster 520 of reference embeddings. That is, by applying the third example learning rule 500, the neuromorphic processor determines an update procedure to update the gesture recognition model such that the updated gesture recognition model modifies the way it has been previously trained to classify a new gesture into one of the predetermined sets of gesture classifications and determines the modified gesture classification for the new gesture.

Figure 6:
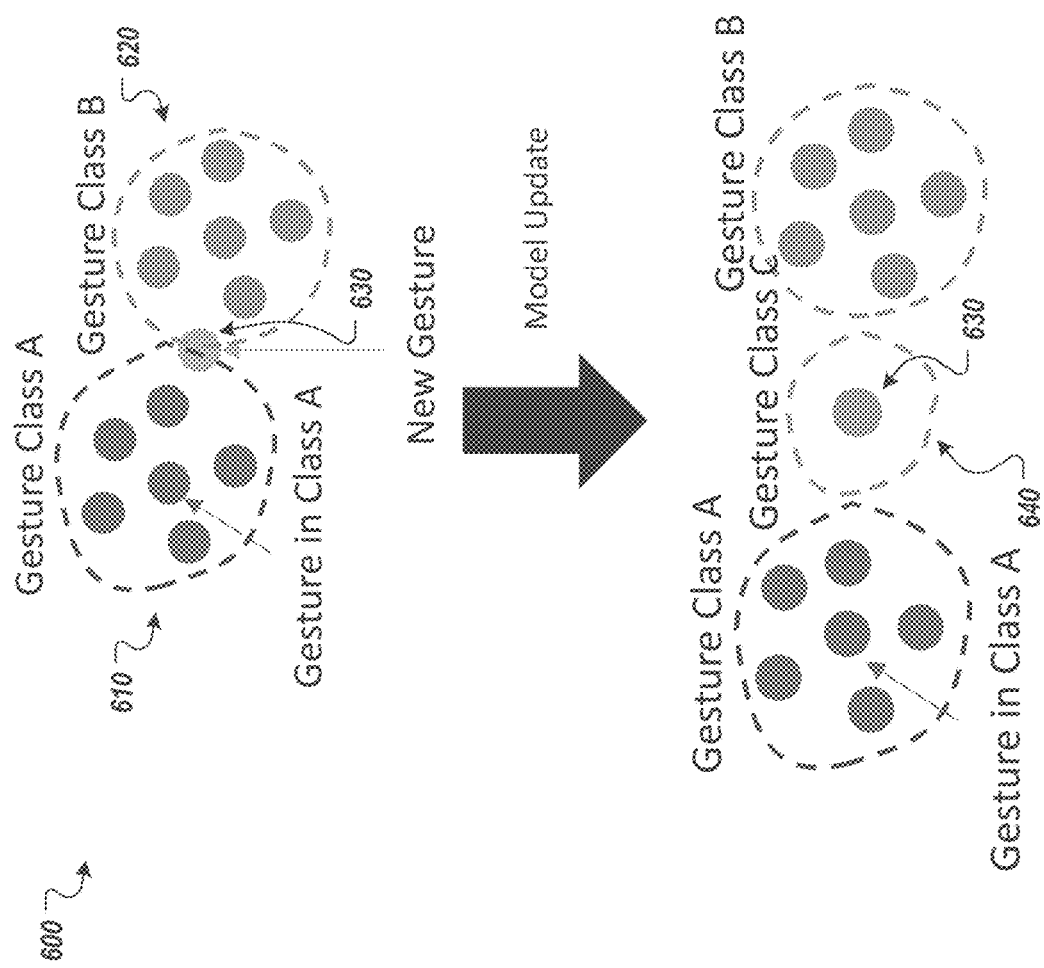
FIG. 6 depicts a fourth example learning rule for updating a self-learning gesture recognition model.

FIG. 6 depicts a fourth example learning rule 600 for updating a self-learning gesture recognition model. Similar to the example of FIG. 3, during the initial training process the gesture recognition model may be trained to learn mappings from gestures to regions defined by clusters 610 and 620 in a latent space that correspond to a first gesture classification ("Gesture Class A") and a second gesture classification ("Gesture Class B"), respectively.

The fourth example learning rule 600 may specify: if a first distance between the new gesture embedding and a boundary of a first cluster of reference embeddings and a second distance between the new gesture embedding and a boundary of a second cluster of reference embeddings are both below a threshold distance, then use a specified update procedure to update the trained gesture recognition model such that the boundary of the first cluster of reference embeddings and the boundary of the second cluster of reference embeddings are both shifted farther away from the new embedding. Although two clusters 610 and 620 are shown in this example, any number of clusters can be similarly updated (with their respective boundaries shifted farther away from the new embedding).

As shown in FIG. 6, a first distance between the new gesture embedding 630 and a boundary of a first cluster 610 of reference embeddings and a second distance between the new gesture embedding 630 and a boundary of a second cluster 620 of reference embeddings are both below a threshold distance, i.e., with the new gesture embedding 630 being proximate to both cluster boundaries as shown. In addition, the new gesture should be classified into a new gesture classification ("Gesture Class C") that is not in the predetermined set of gesture classification. Accordingly, the fourth example learning rule 600 specifies that gesture recognition model should be updated such that the boundary of the first cluster 610 of reference embeddings and the boundary of the second cluster 620 of reference embeddings are both shifted farther away from the new embedding 630, and the new embedding 630 should itself form a new cluster 640, which corresponds to a new gesture classification ("Gesture Class C") that is not in the predetermined set of gesture classification. That is, by applying the fourth example learning rule 600, the neuromorphic processor determines a procedure to update the gesture recognition model such that the updated gesture recognition model (i) adds to the predetermined set of gesture classifications a new gesture classification, and classifies a new gesture into the new gesture classification, and additionally (ii) modifies the way it has been previously trained to classify another new gesture into one of the predetermined set of gesture classifications and determines the modified gesture classification for the other new gesture.

Figure 7:
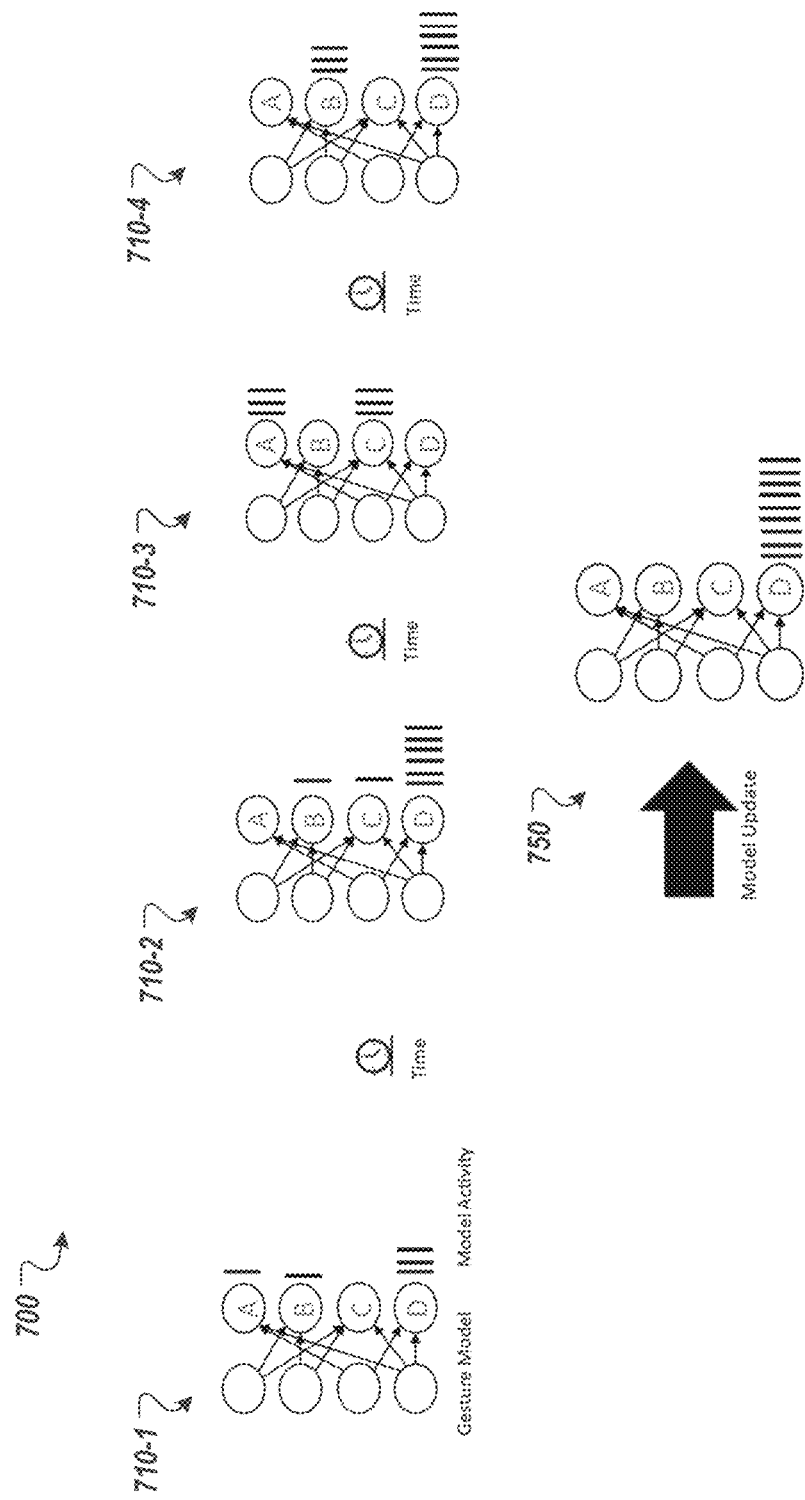
FIG. 7 depicts a fifth example learning rule for updating a self-learning gesture recognition model.

FIG. 7 depicts a fifth example learning rule 700 for updating a self-learning gesture recognition model. Similar to the example of FIG. 3, during the initial training process the gesture recognition model may be trained to learn mappings from gestures to regions defined by clusters in a latent space that correspond to a first gesture classification ("Gesture Class A") and a second gesture classification ("Gesture Class B"), a third gesture classification ("Gesture Class C") and a fourth gesture classification ("Gesture Class D"), respectively.

The fifth example learning rule 700 may specify: if the gesture recognition model has activity but it is weak for a gesture classification (e.g., the activity level does not meet a threshold), aggregate and average the activity then update the class with the most activity until it is an acceptable level of activity for consistent recognition of the gesture has been monitored. The update can be performed with a learning rule, such as a Surrogate-gradient Online Error-triggered Learning (SOEL) rule.

In the example of FIG. 7, over time periods 710-1 through 710-4, gestures are classified into clusters A-D. For example, three gestures are classified into cluster D during the first time period and one gesture is classified into cluster A and one gesture is classified into cluster B. In a subsequent time period 710-2, one gesture is classified into cluster B, one gesture is classified into cluster C, and six gestures are classified into cluster D. The classifications can be aggregated over time and averaged across the time periods, e.g., by the parameter updater 130.

Once an acceptable level of activity has been monitored, the learning rule is used to update the gesture recognition model based on the cluster to which most of the gestures were classified, which is cluster D in this example. The model can be updated such that future gestures similar to the gestures monitored over the time period are more likely to be classified into cluster D.

Figure 8:
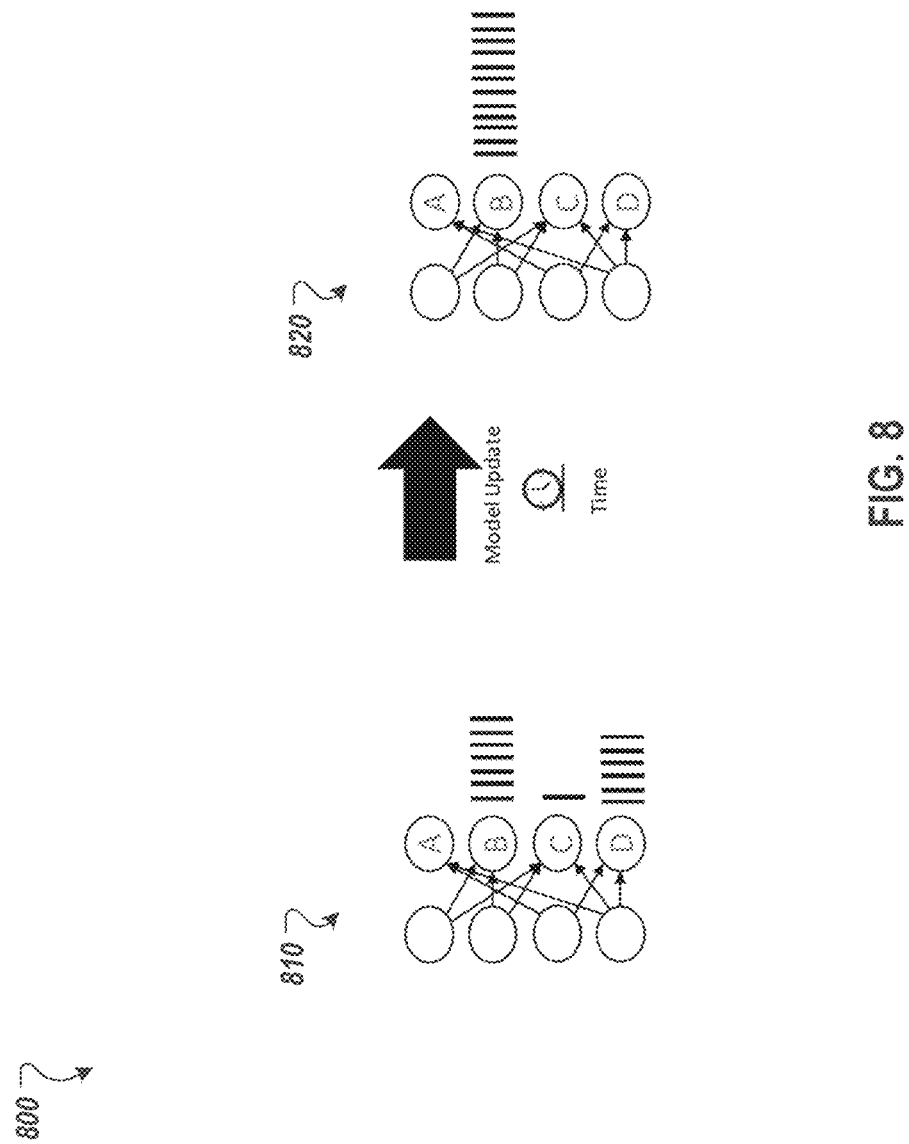
FIG. 8 depicts a sixth example learning rule for updating a self-learning gesture recognition model.

FIG. 8 depicts a sixth example learning rule 800 for updating a self-learning gesture recognition model. Similar to the example of FIG. 7, during the initial training process the gesture recognition model may be trained to learn mappings from gestures to regions defined by clusters in a latent space that correspond to a first gesture classification ("Gesture Class A") and a second gesture classification ("Gesture Class B"), a third gesture classification ("Gesture Class C") and a fourth gesture classification ("Gesture Class D"), respectively.

The sixth example learning rule 800 may specify: if the gesture recognition model has activity but it is weak for a gesture classification (e.g., the activity level does not meet a threshold), aggregate and average the activity then update the class with the most activity and decrease the activity of any other gestures detected so that the model considers the gesture of the most active classification instead of the other classification. In the example of FIG. 8, at time period 810, "Gesture Class D" is considered as among the other classes with activity levels below the threshold, and at time period 820 the gesture recognition model is updated such that similar gestures are classified into "Gesture Class B," the gesture classification with the most activity.

Referring back to FIG. 2, the neuromorphic processor determines, in accordance with the one or more determined procedures, an update to values of one or more parameters of the trained gesture recognition model (250). The neuromorphic processor can use the learning rules to update the parameters of the gesture recognition model continuously and/or in real-time at the client device without any additional training being performed off of the client device. For example, no weights or gradients have to be exchanged with the cloud platform to update the gesture recognition model.

The neuromorphic processor can continue updating the gesture recognition model continuously and/or for each gesture recognition event. For example, the neuromorphic processor can repeat process 200 every time new data that characterizes a new gesture is received.

Figure 9:
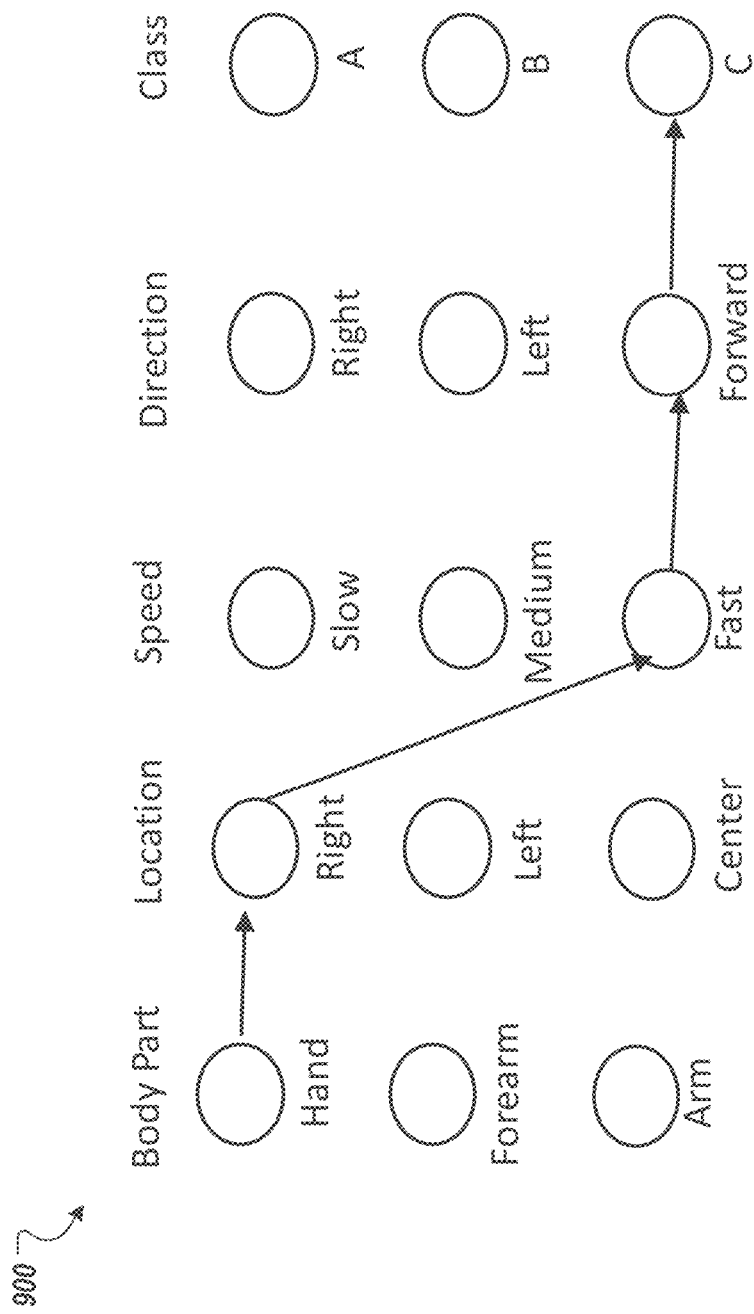
FIG. 9 depicts example feature embeddings that can be learned using a self-learning gesture recognition model.

FIG. 9 depicts example feature embeddings 900 that can be learned using a self-learning gesture recognition model. The gesture recognition model can consider embeddings related to, for example, body parts, location of the body parts, speed of motion, and the direction of motion. In this example, there are three possible values for each embedding, but other embeddings and other values for each embedding can also be used. In this example, the model classified a gesture into class C based on embeddings that represent that a fast gesture was performed in a forward motion using a hand to the right side of the person's body.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array), an ASIC (application specific integrated circuit), a neuromorphic research chip, such as Intel's Loihi chip, or a neural network processor, such as BrainChip's Akida™ chip. The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit) a neuromorphic research chip, such as Intel's Loihi chip, or a neural network processor, such as BrainChip's Akida™ chip.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
  receiving, by a trained gesture recognition model deployed on a neuromorphic processor of a client device, data that characterizes a new gesture, wherein the trained gesture recognition model has been trained to process the data that characterizes the new gesture and to determine a gesture classification for the new gesture from a predetermined set of gesture classifications;
  processing, by the trained gesture recognition model, the data that characterizes the new gesture to generate a new embedding in a latent space;
  for each of multiple clusters of reference embeddings in the latent space, determining a respective distance in the latent space between (i) the cluster of reference embedding and (ii) the new embedding, wherein each reference embedding is generated by the trained gesture recognition model from processing data that characterizes a reference gesture, and wherein each cluster of reference embeddings corresponds to one gesture classification in the predetermined set of gesture classifications;
  determining, by the neuromorphic processor and based on applying one or more learning rules to the respective distances in the latent space, one or more procedures to update the trained gesture recognition model; and
  determining, by the neuromorphic processor and in accordance with the one or more determined procedures, an update to values of one or more parameters of the trained gesture recognition model,
  wherein determining one or more procedures to update the trained gesture recognition model comprises:
    determining a procedure to update the trained gesture recognition model such that the updated trained gesture recognition model modifies one of the predetermined set of gesture classifications and determines the modified gesture classification for the new gesture.

2. The method of claim 1, wherein the trained gesture recognition model is implemented as a spiking neural network (SNN).

3. The method of claim 1, wherein data that characterizes the gesture comprises streaming data transmitted from a vision sensor of the client device.

4. The method of claim 1, wherein determining one or more procedures to update the trained gesture recognition model comprises:
  determining a procedure to update the trained gesture recognition model such that the updated trained gesture recognition model determines a new gesture classification for the new gesture that is not in the predetermined set of gesture classifications.

5. The method of claim 1, wherein determining one or more procedures to update the trained gesture recognition model comprises:
  determining that the new gesture embedding is outside of a boundary of a first cluster of reference embeddings but a distance in the latent space between the new embedding and the boundary of the first cluster of reference embeddings is below a threshold distance; and
  determining a procedure to update the trained gesture recognition model such that new embedding is within the boundary of the first cluster of reference embeddings.

6. The method of claim 5, wherein determining one or more procedures to update the trained gesture recognition model comprises:
  determining that the new embedding is outside of the boundary of the first cluster of reference embeddings and the distance in the latent space between the new embedding and the boundary of the first cluster of reference embeddings is above a threshold distance; and
  determining a procedure to update the trained gesture recognition model such that new embedding is within a boundary of a new cluster of embeddings that include the new embedding, wherein the new cluster of embeddings corresponds to the new gesture classification that is not in the predetermined set of gesture classifications.

7. The method of claim 5, wherein determining one or more procedures to update the trained gesture recognition model comprises:
  determining that a first distance between the new embedding and a center of the first cluster of reference embeddings is greater than a second distance between the new embedding and a center of a second cluster of reference embeddings; and
  determining a procedure to update the trained gesture recognition model such that the center of the second cluster of reference embeddings shifts closer to the new embedding and farther away from the center of the first cluster of reference embeddings.

8. The method of claim 7, wherein determining one or more procedures to update the trained gesture recognition model comprises:
  determining that a first distance between the new gesture embedding and the boundary of the first cluster of reference embeddings and a second distance between the new gesture embedding and a boundary of the second cluster of reference embeddings are both below a threshold distance; and
  determining a procedure to update the trained gesture recognition model such that the boundary of the first cluster of reference embeddings and the boundary of the second cluster of reference embeddings are both shifted farther away from the new embedding.

9. The method of claim 1, wherein determining one or more procedures to update the trained gesture recognition model comprises:
  receiving a user input specifying a ground truth gesture classification for the new gesture; and
  determining a procedure to update the trained gesture recognition model such that the trained gesture recognition model determines the ground truth gesture classification for the new gesture.

10. The method of claim 9, wherein the user input specifying a ground truth gesture classification for the new gesture comprises a text or audio input.

11. The method of claim 9, wherein the trained gesture recognition model is obtained through a gradient-based optimization process based on a surrogate gradient of a supervised generative loss function computed with respect to the parameters of the gesture recognition model.

12. One or more non-transitory computer-readable storage media storing instructions that when executed by one or more computers cause the one or more computers to perform operations comprising:
receiving, by a trained gesture recognition model deployed on a neuromorphic processor of a client device, data that characterizes a new gesture, wherein the trained gesture recognition model has been trained to process the data that characterizes the new gesture and to determine a gesture classification for the new gesture from a predetermined set of gesture classifications;
processing, by the trained gesture recognition model, the data that characterizes the new gesture to generate a new embedding in a latent space;
for each of multiple clusters of reference embeddings in the latent space, determining a respective distance in the latent space between (i) the cluster of reference embedding and (ii) the new embedding, wherein each reference embedding is generated by the trained gesture recognition model from processing data that characterizes a reference gesture, and wherein each cluster of reference embeddings corresponds to one gesture classification in the predetermined set of gesture classifications;
determining, by the neuromorphic processor and based on applying one or more learning rules to the respective distances in the latent space, one or more procedures to update the trained gesture recognition model; and
determining, by the neuromorphic processor and in accordance with the one or more determined procedures, an update to values of one or more parameters of the trained gesture recognition model,
wherein determining one or more procedures to update the trained gesture recognition model comprises:
determining a procedure to update the trained gesture recognition model such that the updated trained gesture recognition model modifies one of the predetermined set of gesture classifications and determines the modified gesture classification for the new gesture.

13. A system comprising one or more computers and one or more storage devices storing instructions that when executed by one or more computers cause the one or more computers to perform operations comprising:
receiving, by a trained gesture recognition model deployed on a neuromorphic processor of a client device, data that characterizes a new gesture, wherein the trained gesture recognition model has been trained to process the data that characterizes the new gesture and to determine a gesture classification for the new gesture from a predetermined set of gesture classifications;
processing, by the trained gesture recognition model, the data that characterizes the new gesture to generate a new embedding in a latent space;
for each of multiple clusters of reference embeddings in the latent space, determining a respective distance in the latent space between (i) the cluster of reference embedding and (ii) the new embedding, wherein each reference embedding is generated by the trained gesture recognition model from processing data that characterizes a reference gesture, and wherein each cluster of reference embeddings corresponds to one gesture classification in the predetermined set of gesture classifications;
determining, by the neuromorphic processor and based on applying one or more learning rules to the respective distances in the latent space, one or more procedures to update the trained gesture recognition model; and
determining, by the neuromorphic processor and in accordance with the one or more determined procedures, an update to values of one or more parameters of the trained gesture recognition model,
wherein determining one or more procedures to update the trained gesture recognition model comprises:
determining a procedure to update the trained gesture recognition model such that the updated trained gesture recognition model modifies one of the predetermined set of gesture classifications and determines the modified gesture classification for the new gesture.

14. The system of claim 13, wherein the trained gesture recognition model is implemented as a spiking neural network (SNN).

15. The system of claim 13, wherein data that characterizes the gesture comprises streaming data transmitted from a vision sensor of the client device.

16. The system of claim 13, wherein determining one or more procedures to update the trained gesture recognition model comprises:
determining a procedure to update the trained gesture recognition model such that the updated trained gesture recognition model determines a new gesture classification for the new gesture that is not in the predetermined set of gesture classifications.

17. The system of claim 13, wherein determining one or more procedures to update the trained gesture recognition model comprises:
determining that the new gesture embedding is outside of a boundary of a first cluster of reference embeddings but a distance in the latent space between the new embedding and the boundary of the first cluster of reference embeddings is below a threshold distance; and
determining a procedure to update the trained gesture recognition model such that new embedding is within the boundary of the first cluster of reference embeddings.

18. The system of claim 13, wherein determining one or more procedures to update the trained gesture recognition model comprises:
receiving a user input specifying a ground truth gesture classification for the new gesture; and
determining a procedure to update the trained gesture recognition model such that the trained gesture recognition model determines the ground truth gesture classification for the new gesture.

* * * * *